US011661040B2

(12) United States Patent
Mellings et al.

(10) Patent No.: US 11,661,040 B2
(45) Date of Patent: May 30, 2023

(54) BRAKING SYSTEM

(71) Applicant: Haldex Brake Products AB, Landskrona (SE)

(72) Inventors: Carl Mellings, Lindley (GB); Alexander Kraus, Lindley (GB); Dudley Harrison, Lindley (GB); Andreas Jahnke, Landskrona (SE)

(73) Assignee: Haldex Brake Products AB, Landskrona (SE)

( * ) Notice: Subject to any disclaimer, the term of this patent is extended or adjusted under 35 U.S.C. 154(b) by 0 days.

(21) Appl. No.: 16/764,063

(22) PCT Filed: Nov. 21, 2018

(86) PCT No.: PCT/EP2018/082128
§ 371 (c)(1),
(2) Date: May 14, 2020

(87) PCT Pub. No.: WO2019/101818
PCT Pub. Date: May 31, 2019

(65) Prior Publication Data
US 2020/0384963 A1 Dec. 10, 2020

(30) Foreign Application Priority Data
Nov. 21, 2017 (GB) ...................................... 1719344
Nov. 22, 2017 (GB) ...................................... 1719415

(51) Int. Cl.
*B60T 7/20* (2006.01)
*B60T 8/171* (2006.01)
(Continued)

(52) U.S. Cl.
CPC ................ *B60T 7/20* (2013.01); *B60T 8/171* (2013.01); *B60T 8/172* (2013.01); *B60T 8/327* (2013.01);
(Continued)

(58) Field of Classification Search
CPC . B60T 7/20; B60T 8/171; B60T 8/172; B60T 8/94; B60T 8/323; B60T 8/327;
(Continued)

(56) References Cited

U.S. PATENT DOCUMENTS 3,761,139 A 9/1973 Rogers
4,076,325 A * 2/1978 Bray ..................... B60T 13/268
303/29
(Continued)

FOREIGN PATENT DOCUMENTS

CN 10666053 5/2017
DE 102014107399 * 11/2015
(Continued)

OTHER PUBLICATIONS

English machined translation of DE-102014107399 (Description) Nov. 2015.*
(Continued)

*Primary Examiner* — Nicholas J Lane
*Assistant Examiner* — San M Aung
(74) *Attorney, Agent, or Firm* — Boyle Fredrickson, S.C.

(57) ABSTRACT

A vehicle braking system including a control unit (340) which is operable to communicate with at least one sensor (320, 350), the sensor (320, 350) being operable to provide signals corresponding to a characteristic of a vehicle to the control unit (340), and the control unit (340) being in communication with a brake demand source (300) to receive brake demand data, and the control unit (340) also being in communication with a plurality of wheel end units, each wheel end unit including a brake torque control unit (310) which is operable to control an associated brake actuator to apply a braking torque dependent upon a signal received from the control unit (340).

16 Claims, 7 Drawing Sheets

(51) Int. Cl.
*B60T 8/172* (2006.01)
*B60T 8/32* (2006.01)
*B60T 8/88* (2006.01)
*B60T 8/94* (2006.01)
*B60T 13/68* (2006.01)
*B60T 15/18* (2006.01)

(52) U.S. Cl.
CPC .............. *B60T 8/885* (2013.01); *B60T 8/94* (2013.01); *B60T 13/683* (2013.01); *B60T 15/181* (2013.01); *B60T 2220/00* (2013.01); *B60T 2240/00* (2013.01); *B60T 2250/03* (2013.01); *B60T 2270/402* (2013.01); *B60T 2270/404* (2013.01); *B60T 2270/406* (2013.01); *B60T 2270/82* (2013.01)

(58) Field of Classification Search
CPC .... B60T 8/885; B60T 8/1708; B60T 8/17551; B60T 8/32; B60T 13/263; B60T 13/403; B60T 13/683; B60T 13/68; B60T 13/66; B60T 15/181; B60T 17/22; B60T 2220/00; B60T 2240/00; B60T 2250/03; B60T 2270/82; B60T 2270/402; B60T 2270/404; B60T 2270/406
USPC ........................................................ 303/6.01
See application file for complete search history.

(56) References Cited

U.S. PATENT DOCUMENTS

| | | | | |
|---|---|---|---|---|
| 5,707,117 A * | 1/1998 | Hu | ............................ | B60T 8/90 701/72 |
| 5,884,986 A | 3/1999 | Shimizu | | |
| 2003/0042790 A1 * | 3/2003 | Amberkar | .............. | B62D 7/159 303/140 |
| 2010/0066161 A1 * | 3/2010 | Fry | ......................... | B60T 8/241 303/9.66 |
| 2010/0106385 A1 * | 4/2010 | Ramler | ................. | B60T 13/265 303/11 |
| 2010/0237690 A1 * | 9/2010 | Forster | ................. | B60T 13/263 303/13 |
| 2012/0112523 A1 * | 5/2012 | Stoehr | .................... | B60T 17/02 303/2 |
| 2015/0012199 A1 * | 1/2015 | Mederer | .................. | B60T 7/20 701/70 |
| 2015/0336548 A1 * | 11/2015 | Morselli | ............... | B60T 11/203 701/70 |
| 2018/0111591 A1 * | 4/2018 | Fry | .................... | B60T 8/17554 |

FOREIGN PATENT DOCUMENTS

| | | | | |
|---|---|---|---|---|
| DE | 102014107399 A1 * | 11/2015 | ........... | B60T 13/683 |
| GB | 2114245 | 8/1983 | | |
| GB | 2338274 | 12/1999 | | |
| GB | 2448007 | 10/2008 | | |
| JP | 10109629 | 4/1998 | | |
| JP | 2000168525 | 6/2000 | | |
| KR | 20020047550 | 12/2000 | | |

OTHER PUBLICATIONS

English machined translation of DE-102014107399 (Claims) Nov. 2015.*
GB1719344.2 Search Report dated Apr. 13, 2018, 5 pages.
GB1719344.2 Search Report dated Dec. 19, 2018, 2 pages.
GB1719415.0 Search Report dated Apr. 4, 2019, 5 pages.
PCT/EP2018/082128, International Search Report and Written Opinion dated Jun. 16, 2019, 20 pages.

* cited by examiner

BRAKING SYSTEM

This invention relates to vehicle braking systems, control modules, and associated methods.

It is known to provide electro-pneumatic braking systems, in which a foot brake modulator detects the vehicle driver's brake request, for example by receiving one or more signals from one or more sensors. A central control unit electrically controls electro-pneumatic control modules which convert the electrical brake signals of the central control unit into pneumatic pressures based upon the desired brake value. It is known, for example from DE102014107399 to provide electronic braking systems which include two electronic service brake circuits. The braking system generates a first setpoint for a for a first one of the electronic braking circuits and a second setpoint for a second one of the electronic braking circuits, based upon braking demand from a foot pedal. In normal operation, higher functions, such as ABS, for example, which generate signals which modify the or each setpoint are performed in a first control unit of the first braking circuit while the second braking circuit generates only the second brake setpoint, which may be suppressed or act as a plausibility check for the first control unit. In a fault condition where the first circuit fails, the second service braking circuit is used to provide signals to generate a braking pressure in at least one pressure control module of the braking system.

It is also known to provide an electronically controlled braking system which includes two independent electronic brake control circuits, each of which 30 drives a brake of the front axle and the rear axle of the vehicle in a diagonal arrangement. In such a system, two separate power supplies, two central control units and a foot brake module with two separate channels (brake encoder circuits) are provided to comply with the safety requirements. The two control units are communicable with one another for the exchange of information and the monitoring of functions of the two brake circuits.

U.S. Pat. No. 6,206,481 describes a trailer control valve for a braking system which includes pistons for actuating a double seat valve which can control the communication between a compressed air reservoir, a compressed air consumer and a pressure relief location. A control piston is provided that is jointly associated with an electrical control circuit and a pneumatic control circuit of a service brake system. A valve is provided which is connected to the pneumatic control circuit of the service brake system, which closes the pneumatic control circuit of the service brake off from the trailer control valve when the electrical control circuit is functional, and in the event of a failure of the electrical control circuit, unblocks the pneumatic control circuit of the service brake system.

In embodiments of the present invention, there is provided a vehicle braking system including a control unit which is operable to communicate with at least one sensor, the sensor being operable to provide signals corresponding to a characteristic of a vehicle to the control unit, and the control unit being in communication with a brake demand source to receive brake demand data, and the control unit also being in communication with a plurality of wheel end units, each wheel end unit including a brake torque control unit which is operable to control an associated brake actuator to apply a braking torque dependent upon a signal received from the control unit.

Each wheel end unit may include a diagnostics unit.

Each brake torque control unit and the diagnostics unit of each wheel end unit may be integral with one another.

The at least one sensor may include at least one of a yaw sensor and a steer angle sensor.

Each wheel end unit may include one of a fast acting brake valve, a relay-based modulator with an associated electronic control unit and an electro-mechanical brake.

At least one of the wheel end units may include a wheel speed sensor which is operable to provide wheel speed data to the brake torque control unit.

There is also provided a trailer control module for a braking system, the trailer control module including an electronic control unit, which is operable to receive a signal indicative of a braking demand from at least one electrical braking control circuit and to provide signals to a supply valve and an exhaust valve which control the supply of pressurised air from a reservoir to one or more trailer brake actuators through a service line and a supply line, wherein the electronic control unit is operable to control an emergency line restrictor valve which is, in turn, operable to control the flow of pressurised fluid from the reservoir to a supply line in the event of a drop in pressure in the service line.

The electronic control unit may receive signals from the or each braking control circuit via a respective CANBUS connection.

The emergency line restrictor valve may be communicable with the electronic control unit via a CANBUS connection.

The emergency line restrictor valve may be integral with the trailer control module.

There is also provided a trailer control module for a braking system, the trailer control module including an electronic control unit, which is operable to receive a signal indicative of a braking demand from at least one electrical braking control circuit wherein the electronic control unit is operable to provide an electrical signal to at least one brake actuator on a trailer in response to a brake demand signal in the event of a drop in pressure in a line which carries pressurised fluid.

The trailer control module may include a supply line and a service line, each of which carries pressurised fluid, and wherein the electronic control unit is operable to provide an electrical braking signal to at least one brake actuator on a trailer in response to a brake demand signal in the event of a drop in pressure in the service line.

The service line and the supply line may be isolated from one another.

The service line may be inoperative.

The electronic control unit may provide the electrical signal to the brake actuator via a CANBUS connection.

The CANBUS connection may follow the ISO11992 standard.

The trailer control module may include one or more pressure transducers operable to provide signals to the electronic control unit which are indicative of the pressure in at least one of the service line and the supply line, and to control at least one of the supply valve and the exhaust valve in response to signals received from the electronic control unit.

There is also provided a vehicle braking system including a trailer control module substantially as described herein.

The vehicle braking system may include a plurality of electrical braking circuits, each being independently operable.

There is also provided a method of operating a braking system for a vehicle which includes a trailer, the braking system including a trailer control module including an electronic control unit, at least one electrical braking control circuit, at least one brake actuator, a supply line and a service line which carry pressurised fluid, wherein the method includes providing a signal indicative of a braking demand from the at least one electrical braking control circuit to the electronic control unit, and in the event of a drop in pressure in the service line, providing an indication of the drop in pressure to the electronic control unit, the electronic control unit then providing an electrical signal indicating the braking demand to at least one brake actuator on a trailer.

The electronic control unit may provide the electrical signal to the or each brake actuator via a CANBUS connection.

The method may include using ISO11992 CANBUS standard for providing the signal from the electronic control unit to the or each brake actuator.

The method may include venting the service line.

The method may include isolating the supply line and the service line from one another.

Embodiments of the invention will now be described, by way of example only, with reference to the accompanying drawings, of which.

Referring to the figures, there is shown a vehicle braking system 10, for a vehicle which includes a towing vehicle and a trailer. The braking system 10 includes a service line (yellow line) 14, for the supply of pressurised air to one or more service brake actuators located on the trailer and an emergency line (red line) 16 which provides the supply of pressurised air to the trailer, and is also used to operate an emergency brake on the trailer in the event of a failure in the service line 14, or associated circuitry.

The braking system 10 includes a trailer control module 12. The trailer control module 12 includes a first port 18, for receiving a supply of pressurised air from a reservoir, and a second port 20 which is a delivery port for providing a pressurised air control signal via the service line 14. A third port 22 of the trailer control valve 12 is an exhaust port, and a fourth port 24 is provided for the pressurised air control signal from a parking brake via a parking brake supply line 25. The trailer control valve 12 also includes an electronic control unit (ECU) 26. The ECU is a microcontroller which receives and provides signals indicative of pressure in the service line 14, supply line 16, parking brake supply line 25, etc., as well as receiving and providing signals indicative of braking demand and required pressure. The ECU may receive and/or provide signals indicative of other characteristics of the braking system 10.

The ECU 26 receives electrical signals via a first pressure transducer 28 which converts a measure of pressure in the service line 14 and/or emergency line 16 to a voltage. A second pressure transducer 30 is connected between the fourth port 24 and the ECU to provide electronic signals relating to the pressure in the parking brake supply line 25.

The ECU 26 provides signals to a supply valve 32 and an exhaust valve which control the supply of pressurised air to the or each trailer brake actuator. The supply valve 32 and the exhaust valve 34 may be solenoid operated valves, with the solenoids being controlled by signals from the ECU 26. The supply valve 32 includes an inlet 36 which is connected to the first port 18, and hence to the emergency line 16, and an outlet 38 which is connected to the exhaust valve 34 and to the first pressure transducer 28. In a first condition, the inlet 36 is disconnected from the outlet 38. In a second condition, the inlet 36 is fluidly communicable with the outlet 38. In an embodiment, the supply valve 36 is biased to its first condition, for example by a spring 40. In other words, the supply valve is normally closed, until the ECU 26 provides an electrical signal, i.e. a voltage, to the solenoid to override the bias, and place the supply valve in the second, open condition, such that pressurised air can be supplied to the exhaust valve 34.

The exhaust valve 34 also includes an inlet 42 and an outlet 44. In a first condition, the inlet 42 is fluidly communicable with the outlet 44. In a second condition, the inlet is disconnected from the outlet 44. In an embodiment, the exhaust valve is biased to its first condition, for example by a spring 46. In other words, the exhaust valve 34 is normally open, unless and until the ECU 26 provides a signal, i.e. a voltage, to the solenoid of the exhaust valve 34 to override the bias, and place the exhaust valve 34 in the second, closed condition.

It will be appreciated that the supply and exhaust valves 32, 34 need not be solenoid valves and may be pneumatically controlled valves.

The ECU 26 is communicable with a first transceiver which provides signals from a first electrical braking control circuit via a CANBUS connection 50. The first electrical braking control circuit may control the operation of brakes on a front axle of the vehicle, for example. The ECU is communicable with a second transceiver which provides signals from a second electrical braking control circuit via a further CANBUS connection 52. The second braking control circuit may control the operation of brakes on a rear axle of the vehicle. The first and second braking control circuits provide braking demand signals in response to the application of a braking demand made by the driver. The first and second electrical braking control circuits may be independently operable.

Figure 1:
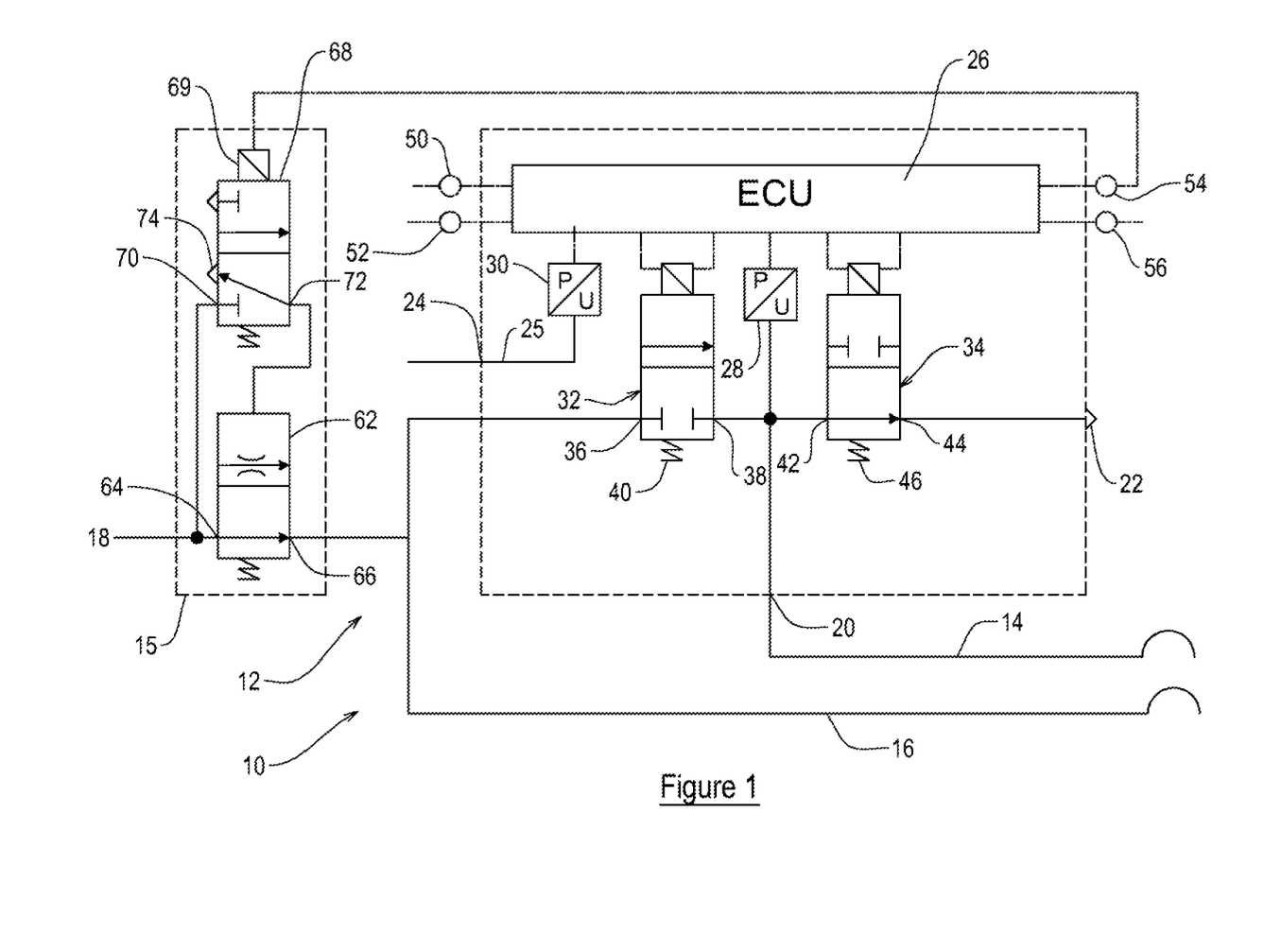
FIG. 1 is a schematic circuit diagram of a trailer control valve in accordance with embodiments of the invention.

The ECU 26 may be communicable with the emergency line restrictor (ELR) valve 15 via a third transceiver 54. The ECU 26 may be communicable with the ELR valve 15 via a CANBUS, or via a direct solenoid connection (as shown in FIG. 1). The ECU is communicable with a fourth transceiver 56 which enables the transfer of data between the towing vehicle and the trailer. In embodiments, the fourth transceiver may follow the ISO11992 standard.

The ELR valve 15 acts to throttle the flow of pressurised fluid from the reservoir into the emergency line 16 in the event of a rupture of in the service line 14 (see below) so that pressure drops in both, to activate the emergency braking mechanism in the trailer. The ELR valve 15 includes a throttle valve 62 which includes an input 64 which is fluidly communicable with the reservoir of pressurised fluid and an output 66 which is fluidly communicable with the emergency line 16. In a first condition, the inlet 64 is fluidly communicable with the outlet 66 such that the emergency line 16 is pressurised. In a second condition, the flow of fluid from the inlet 64 to the outlet 66 is throttled, to reduce the flow of pressurised fluid, and to reduce the pressure in the emergency line 66. The throttle valve 62 is biased to its first condition, preferably by a spring. The throttle valve 62 is controlled by a control valve 68, which includes an inlet 70, which is communicable with the reservoir via a first port. An outlet 72 is communicable with the throttle valve to control the condition of the throttle valve 62. The control valve 68 is solenoid controlled by a solenoid 69, and is electrically communicable with the ECU 26. In a first condition, the inlet 70 is closed, and the outlet 72 vents through an exhaust port 74. In a second condition, the inlet 70 is fluidly communicable with the outlet 72, to move the throttle valve into its second condition and the exhaust port 74 is closed.

In the embodiment shown in FIG. 1, the ELR valve is shown as being external to the trailer control module 12, and is controlled by a solenoid which receives a signal from the ECU 26. The ELR valve 15 is connected between the first port 18 and an emergency line connection between the towing vehicle and the trailer.

Figure 2:
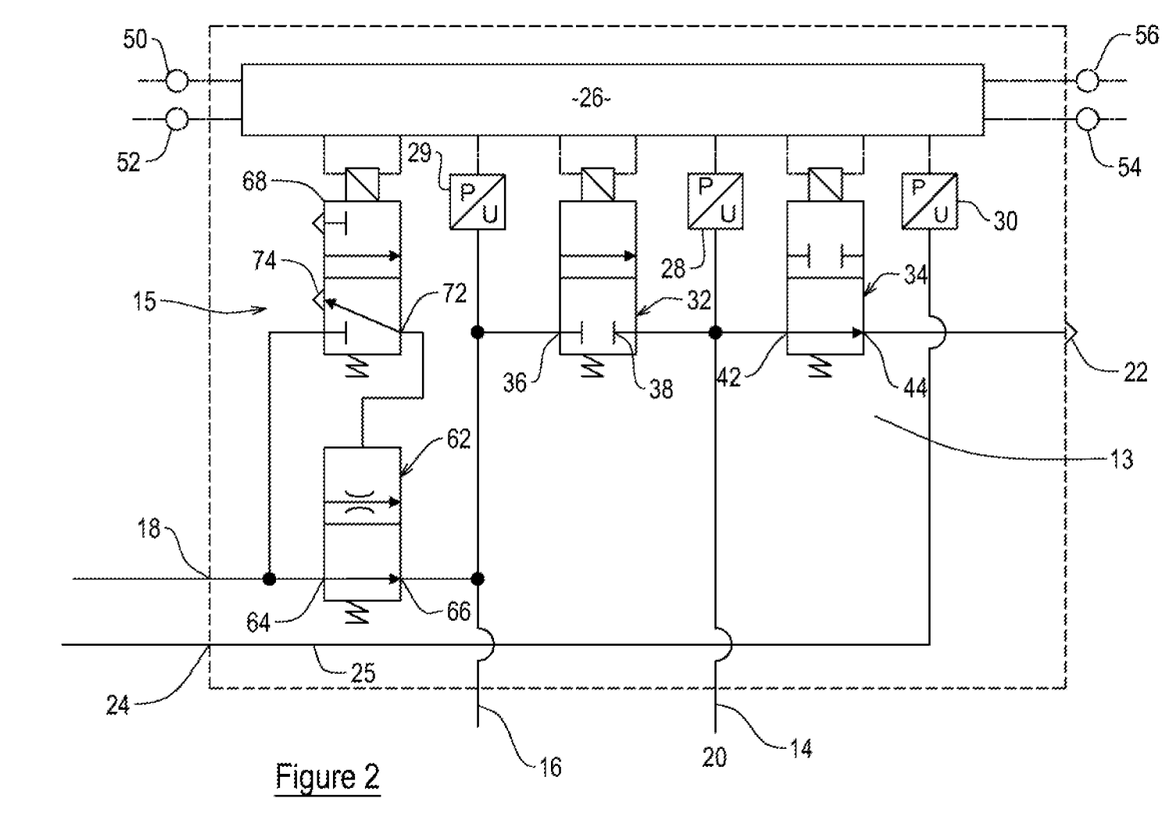
FIG. 2 is a schematic circuit of a trailer control valve including an integrated emergency line restrictor valve.

In the embodiment shown in FIG. 2, the ELR valve 15 is integral with the trailer control module 12. The solenoid of the control valve 68 is controlled by the ECU 26. The embodiment of the trailer control module 12 shown in FIG. 2 includes an additional pressure transducer 29, which provides the ECU 26 with signals which indicate the pressure in the emergency line 16.

Figure 3:
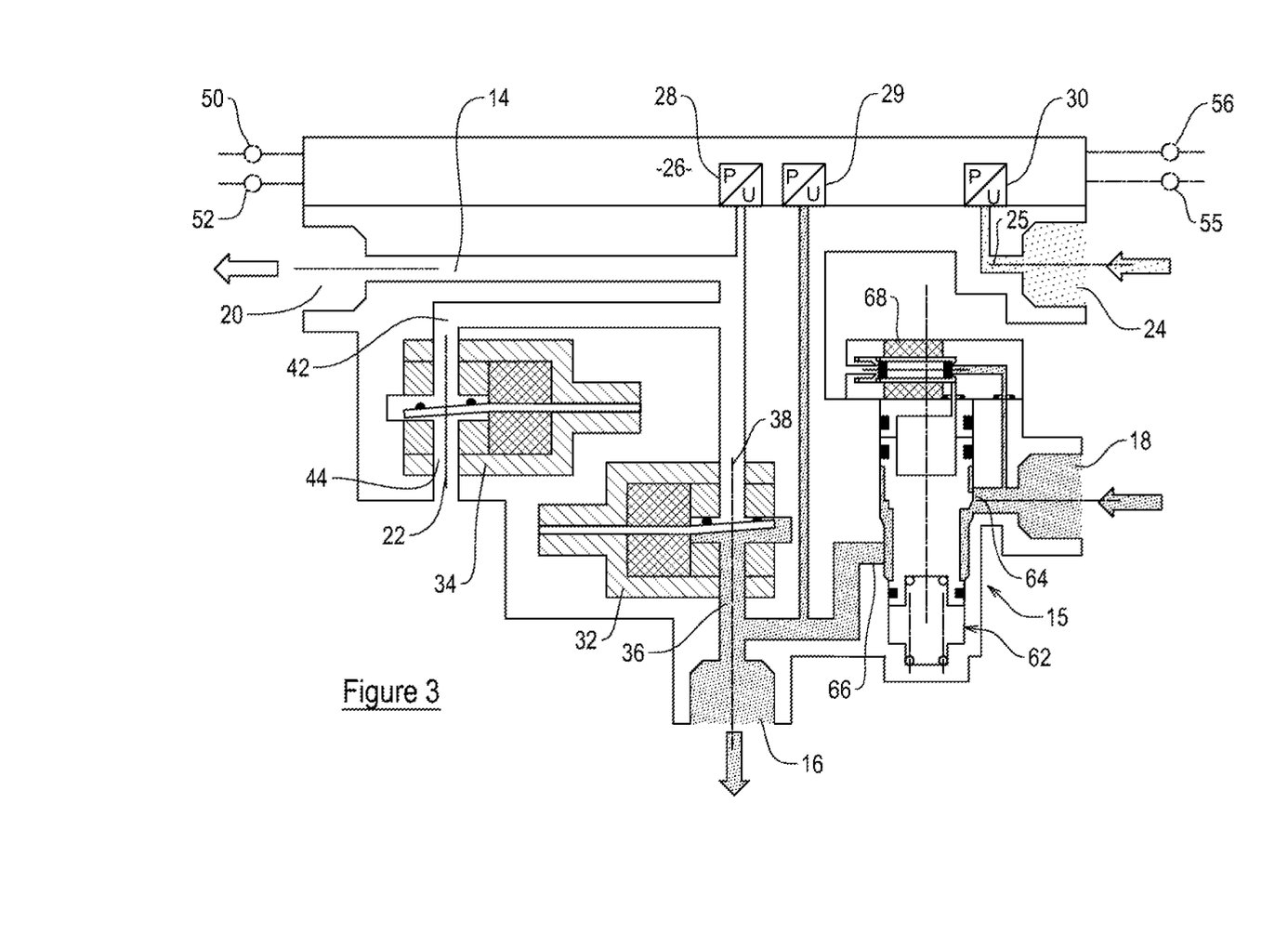
FIG. 3 is a schematic diagram showing the configuration of a trailer control module in normal operating mode, with no brake demand.
Figure 4:
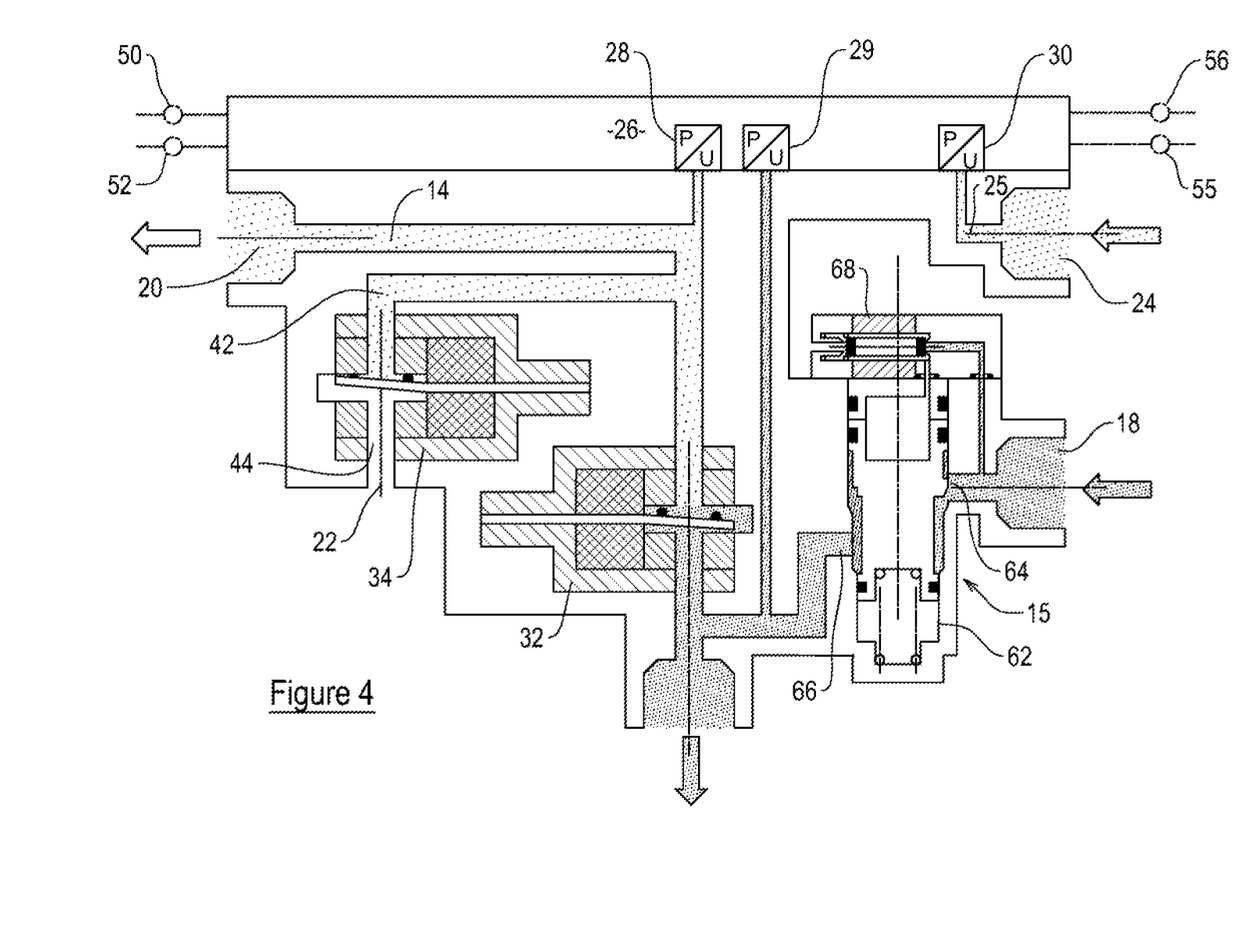
FIG. 4 is a schematic diagram showing the configuration of a trailer control module in normal operating mode, with a brake demand being made.
Figure 5:
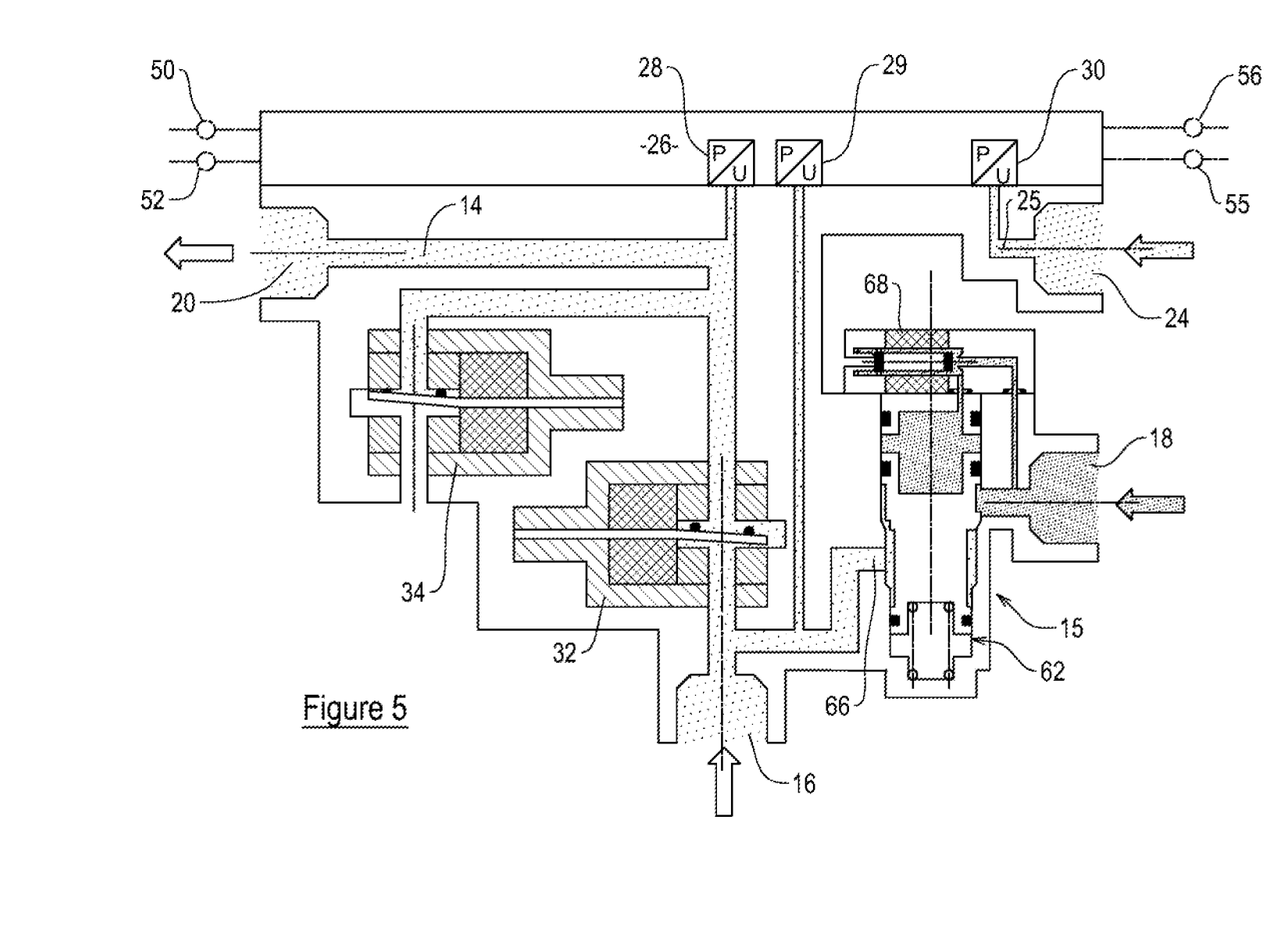
FIG. 5 is a schematic diagram showing the configuration of a trailer control module in normal operating mode but with a damaged service line, with a brake demand being made.

Referring to FIG. 3, the trailer control module 12 is shown in normal operating mode. In FIGS. 3 to 5, the third transceiver 54 has been replaced by a diagnostic connection 55 which is operable to provide information about the operating status of the ECU 26. The transceiver 54 is not required in this configuration of the trailer control module 12 because the ELR valve 15 is integral with the trailer control module 12. No service brake demand input is being made to the ECU 26 from the first or second braking circuit via CANBUS connection 50 or 52. The exhaust valve 34 is vented via the exhaust port 22, therefore the service line 14 is not pressurised. The ELR valve 15 is maintained in its first condition, such that the emergency line 16 is pressurised, and the supply of pressurised fluid to the emergency line 16 is un-throttled.

The control valve 68 vents. In the condition shown in FIG. 3, the parking brake is not applied, therefore the transducer 30 provides a signal indicating that the parking brake line 25 is pressurised. If the transducer were to provide a signal indicating that the park brake is on because line 25 is vented, it would be possible to pressurise service line 14 to apply the service brake as a park brake.

Referring to FIG. 4, the trailer control module is shown in normal operating mode, with a braking demand being made via the first CANBUS connection 50 and/or the second CANBUS connection 52, i.e. via the first and/or second braking circuit(s). In this situation, there is still no parking brake demand, because the parking brake line 25 remains pressurised, and the parking brake remains off. The transducer 29 ensures that the emergency line 16 remains pressurised. The transducer 28 provides an output to open the supply valve 32, so as to pressurise the service line 14, by the supply of pressurised fluid from the reservoir, through the supply valve 32. When the service line 14 is pressurised the or each brake actuator is operated to apply the or each brake to an associated trailer wheel. Opening the supply valve 32 also allows the flow of pressurised fluid between the supply valve 32 and the exhaust valve 34, which is closed to maintain pressure in the supply line 14. In this situation, where there is no failure in any part of the braking system, the ELR valve 15 remains in its first condition, i.e. un-throttled, so as to maintain pressure in the emergency line 16.

Referring to FIG. 5, the trailer control module is shown in a normal operating mode, but where there is a failure in the service line 14, for example the service line 14 may have ruptured, meaning that the requisite pressure cannot be achieved and/or maintained to apply the service brake or to prevent the service brake from disengaging. The trailer control module 12 is able to overcome this problem, as follows. The ECU 26 attempts to pressurise the service line 14 by opening the supply valve 32, as described above. Since the requisite pressure cannot be reached and/or maintained in the service line 14, the transducer 28 indicates a drop in pressure in the service line 14 to the ECU 26. The ELR valve solenoid 69 is activated by a signal from the ECU 26, to move the control valve 68 into its second condition, and hence move the throttle valve 62 into its second, throttled condition. The supply of pressurised fluid from the reservoir into the emergency line 16 is throttled, and since the supply valve 32 is open, the emergency line 16 is exhausted, which applies the emergency brake in the trailer. The parking brake line 25 remains pressurised, such that the parking brake is not applied.

An additional or alternative solution is also possible. Since the trailer control module has CANBUS connection 56 (ISO 11992) via which the towing vehicle is able to communicate with the trailer, the braking demand signal from the brake pedal via the CAN connector(s) 50, 52 to the ECU 26, can be communicated to the trailer via the CANBUS connection 56. The service line 14 is effectively redundant, and may be vented. In this instance, the configuration of the trailer control module is similar to that shown in FIG. 3, i.e. the exhaust valve 34 is vented via the exhaust port 22, and the service line 14 is not pressurised. The ELR valve 15 is maintained in its first condition, such that the emergency line 16 is pressurised, and the supply of pressurised fluid to the emergency line 16 is un-throttled. The control valve 68 vents. In the condition shown in FIG. 3, the parking brake is not being applied, because the transducer 30 provides a signal indicating that the parking brake supply line 25 is pressurised. The difference between this situation and the situation shown in FIG. 3 is that when there is a braking demand from the CANBUS connection(s) 50, 52, the ECU 26 provides a signal to the trailer via CANBUS connection 56, and circumvents the need to pressurise the service line 14. The service line 14 is isolated from the emergency line by the supply valve 32.

Whilst the service line 14 is effectively redundant in this arrangement, it can provide a back-up in the event that the towing vehicle is connected to a vehicle which does not have the capability to communicate with the CANBUS 56, or in the event that the CANBUS connection 56 is present between the towing vehicle and the trailer, but fails. In such a situation, the braking system operates as described in relation to FIG. 5, above.

FIGS. 1 and 2 show solenoid valves as the supply valve 32 and the exhaust valve 34, whereas FIGS. 3-5 indicate fast acting valves, which may be as described in UK patent application number 1719309.5. It will be understood that any appropriate type of valve may be used.

Figure 6A:
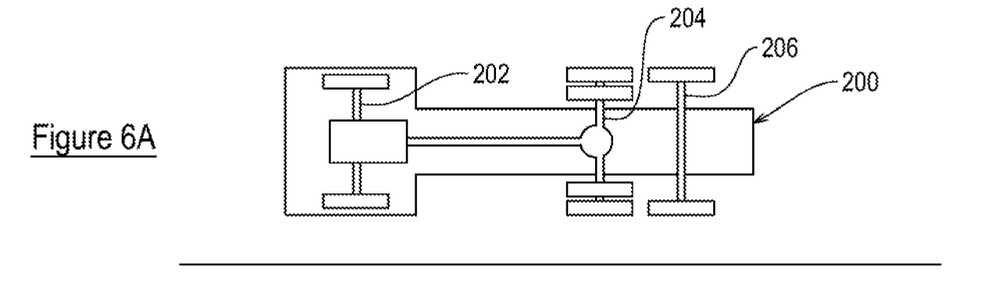
FIG. 6A is an illustration of a vehicle.
Figure 6B:
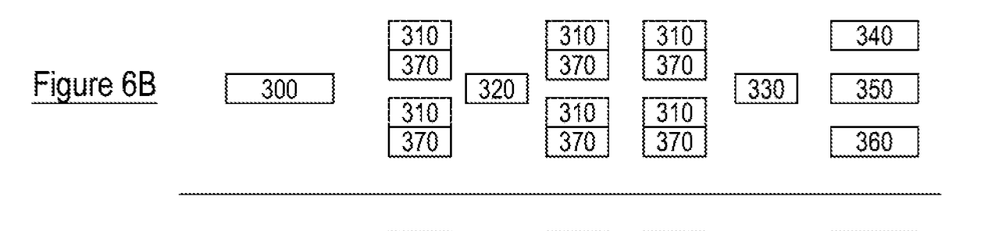
FIG. 6B is an illustration of an embodiment of an electronic braking system suitable for the vehicle of FIG. 6A.
Figure 6C:
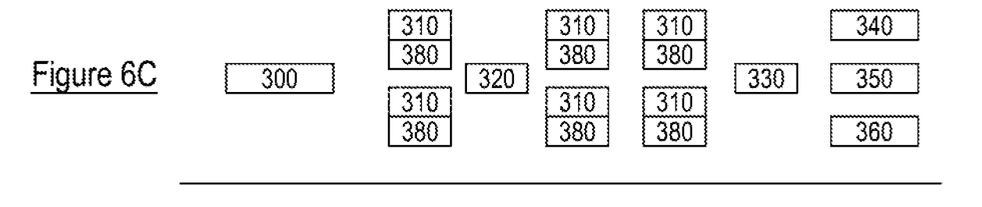
FIG. 6C is an illustration of a further embodiment of an electronic braking system.
Figure 6D:
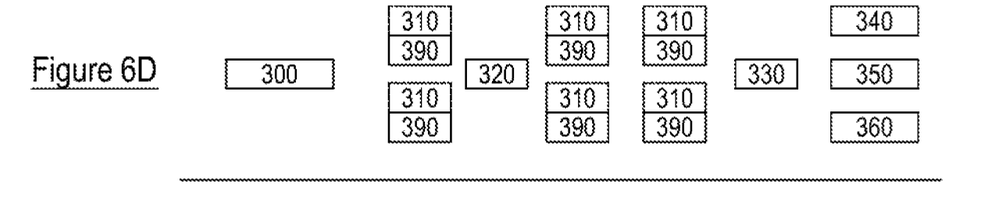
FIG. 6D is an illustration of another embodiment of an electronic braking system.
Figure 7:
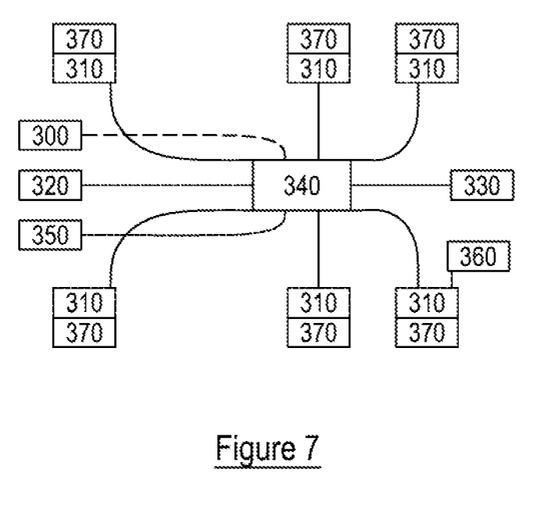
FIG. 7 is an illustration of an embodiment of an electronic braking system showing communication links between components of the system.

Referring to FIGS. 6A-7, there is shown a vehicle 200, having a front axle 202, which in an embodiment is a steering axle; a first rear axle 204, which in an embodiment may be driven; and a second rear axle 206.

A foot brake modulator 300 is provided to receive an input to indicate a braking demand, for example from a brake demand source, i.e. a brake pedal. The foot brake modulator 300 provides an input data signal (indicated by a dashed line in FIG. 7) indicative of the braking demand to a vehicle ECU 340.

The ECU 340 may also be in communication with a yaw sensor 320 and/or a steer angle sensor 350. The yaw sensor 320 and the steer angle sensor 350 are operable to provide data signals (shown by dotted lines in FIG. 7) to the ECU 340. The data signals can be used by the ECU 340 to modify braking demand signals transmitted by the ECU 340, for example.

Each wheel end unit includes a brake torque control and diagnostic module 310, which are also in communication with the ECU 340. Each brake torque control and diagnostic module 310 is capable of receiving brake control information from and sending sensor information to the ECU 340. Each brake torque control module 310 may be powered via its connection to the ECU 340. Each wheel end unit includes a mechanical actuator for applying the brake associated with the wheel. The ECU 340 is capable of setting the brake torque at each individual wheel unit.

One or more of the wheel end units may be in communication with a wheel speed sensor which provides data indicative of the speed of an associated wheel to the diagnostic module 310, which can then transmit the wheel speed data to the ECU 340.

A trailer control module 330 is in communication with the ECU 340. The trailer control module 330 may be of any appropriate type, including any of the embodiments of a trailer control module described herein. The trailer control module may be supplied with power via its connection to the ECU 340, and may exchange data, e.g. sensor data with the ECU 340.

In the embodiments shown in FIGS. 6B-6D, the approximate relative positions of the components of the braking system are shown, but without the communication links, for clarity.

In the embodiment shown in FIG. 6B and FIG. 7, each wheel end unit includes a fast acting brake valve 370 which is communicable with the ECU 340, and is able to control the associated brake actuator in response to a signal from the ECU 340. It will be understood that the braking system is flexible enough that other wheel end controls can be utilised without significantly altering the architecture, or significantly altering the functionality of the braking system. For example, the embodiment shown in FIG. 6C includes a relay-based modulator 380 with an associated ECU at each wheel end unit, in place of the corresponding fast acting valve 370. In FIG. 6D each wheel end unit includes an electro-mechanical brake 390 in place of the corresponding fast acting valve 370.

In use, the vehicle ECU 340 receives signals from the yaw sensor 320, the steer angle sensor 350 and the vehicle speed sensor 360. The ECU 340 provides signals to each brake torque control and diagnostics module 310, which is operable to communicate with the associated wheel end unit to set the brake torque at each wheel end by the wheel end control which is utilised, e.g. fast acting valve 370, relay based modulator with ECU 380 or electro-mechanical brake 390.

A 'mini-modulator' may be used as an appropriate wheel end control. Such a control is disclosed in patent applications GB 2467957, GB2497602 and/or EP2576300, the disclosures of which are incorporated herein by reference.

It will be appreciated the braking system described may be modified to be appropriate for vehicles with different numbers of wheels, or different layouts, for example.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A trailer control module for a braking system including a supply line and a service line, each of which carries pressurised fluid, the trailer control module including an electronic control unit, which is operable to receive a signal indicative of a braking demand from at least one electrical braking control circuit and to provide signals to a supply valve and an exhaust valve which control the supply of pressurised air from a reservoir to one or more trailer brake actuators through the service line and also control the supply of pressurised air from the reservoir to the supply line, wherein the electronic control unit is operable to, in the event of a drop in pressure in the service line, isolate the service line and the supply line from each other and to control an emergency line restrictor valve which is, in turn, operable to throttle the flow of pressurised fluid from the reservoir to the supply line so that the pressure drops in both the supply line and the service line and, as such an emergency braking mechanism is activated on the trailer.

2. A trailer control module according to claim 1 wherein the electronic control unit receives signals from the or each braking control circuit via a respective CANBUS connection.

3. A trailer control module according to claim 1 wherein the emergency line restrictor valve is communicable with the electronic control unit via a CANBUS connection.

4. A trailer control module according to claim 1 wherein the emergency line restrictor valve is integral with the trailer control module.

5. A trailer control module according to claim 1 including one or more pressure transducers operable to provide signals to the electronic control unit which are indicative of the pressure in at least one of the service line and the supply line, and to control at least one of the supply valve and the exhaust valve in response to signals received from the electronic control unit.

6. The trailer control module of claim 1, wherein the emergency line restrictor valve is operable in response to the electronic control unit to throttle the flow of pressurised fluid into an emergency line on the trailer in the event of a loss of pressure in the service line so that pressure drops in both the service line and the emergency line, to activate an emergency brake of the trailer.

7. A trailer control module for a braking system that includes a supply line and a service line, each of which carries pressurised fluid, wherein the trailer control module includes an electronic control unit, wherein the electronic control unit is operable to receive a signal indicative of a braking demand from at least one electrical braking control circuit, wherein the electronic control unit is further operable to provide an electrical signal, via a CANBUS connection, to at least one trailer brake actuator on a trailer in response to a brake demand signal in the event of a drop in pressure in the service line which carries pressurised fluid.

8. A trailer control module according to claim 7 wherein the service line and the supply line are isolated from one another.

9. A trailer control module according to claim 7 wherein the service line is inoperative.

10. A trailer control module according to claim 7 wherein the CANBUS connection follows the ISO11992 standard.

11. The trailer control module of claim 7, wherein the electronic control unit functions to throttle the flow of pressurised fluid into an emergency line in the event of a loss of pressure in the service line that supplies pressurized fluid to the trailer brake actuator, so that pressure drops in both the service line and the emergency line, to activate an emergency brake of the trailer.

12. A method of operating a braking system for a vehicle which includes a trailer, the braking system including a trailer control module including an electronic control unit, at least one brake actuator, a supply line and a service line which carry pressurised fluid, wherein the method includes providing a signal indicative of a braking demand from the at least one electrical trailer braking control circuit to the electronic control unit, and in the event of a drop in pressure in the service line, providing an indication of the drop in pressure to the electronic control unit, the electronic control unit then providing an electrical signal, via a CANBUS connection, indicating the braking demand to at least one brake actuator on a trailer.

13. A method according to claim 12 including using ISO11992 CANBUS standard for providing the signal from the electronic control unit to the at least one brake actuator.

14. A method according to claim 12 including venting the service line.

15. A method according to claim 12 including isolating the supply line and the service line from one another.

16. The method of claim 12, including throttling the flow of pressurised fluid into an emergency line, in response to the electronic control unit, in the event of a loss of pressure in the service line so that pressure drops in both the service line and the emergency line, to activate an emergency brake of the trailer.

* * * * *